UNITED STATES PATENT OFFICE.

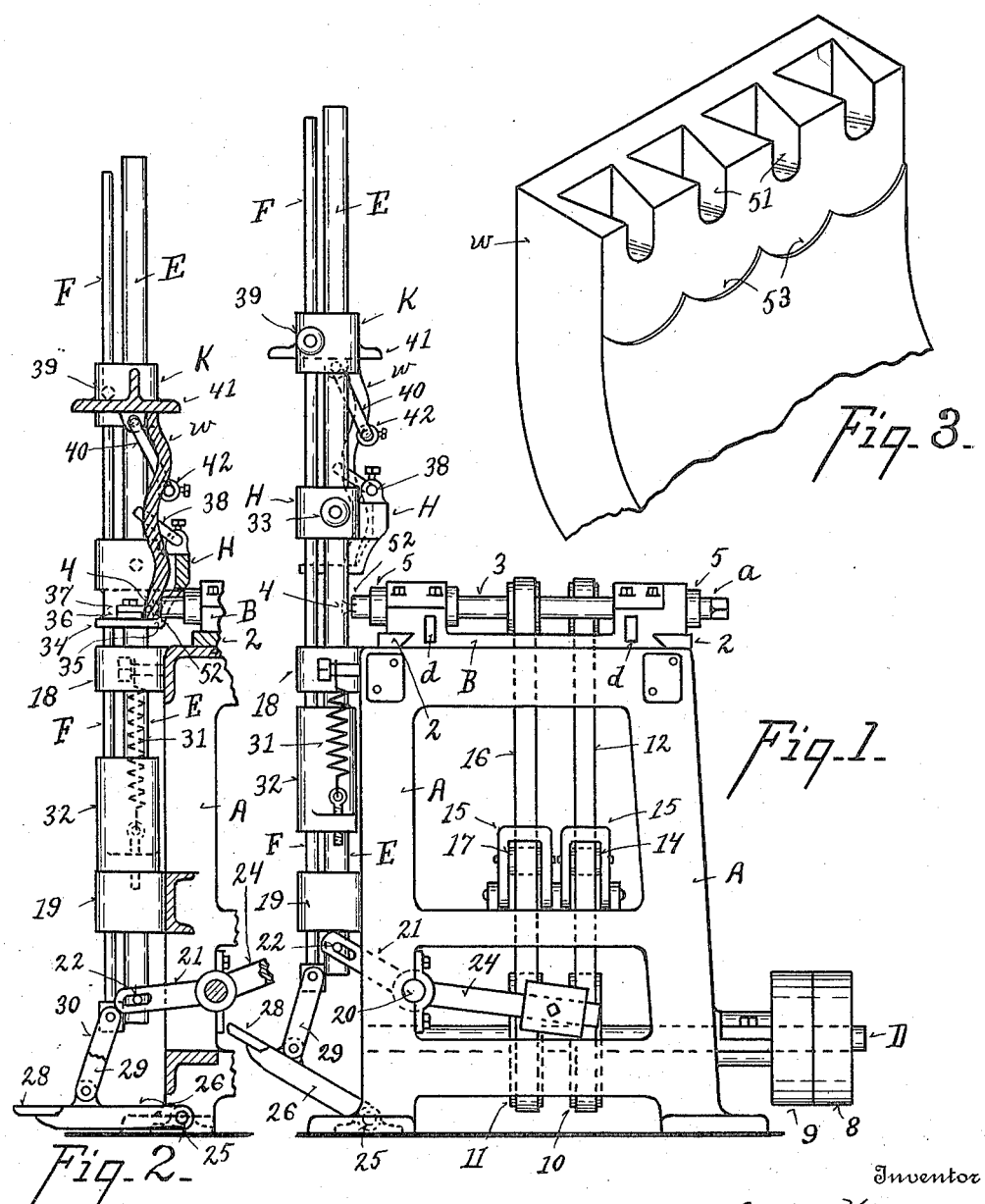

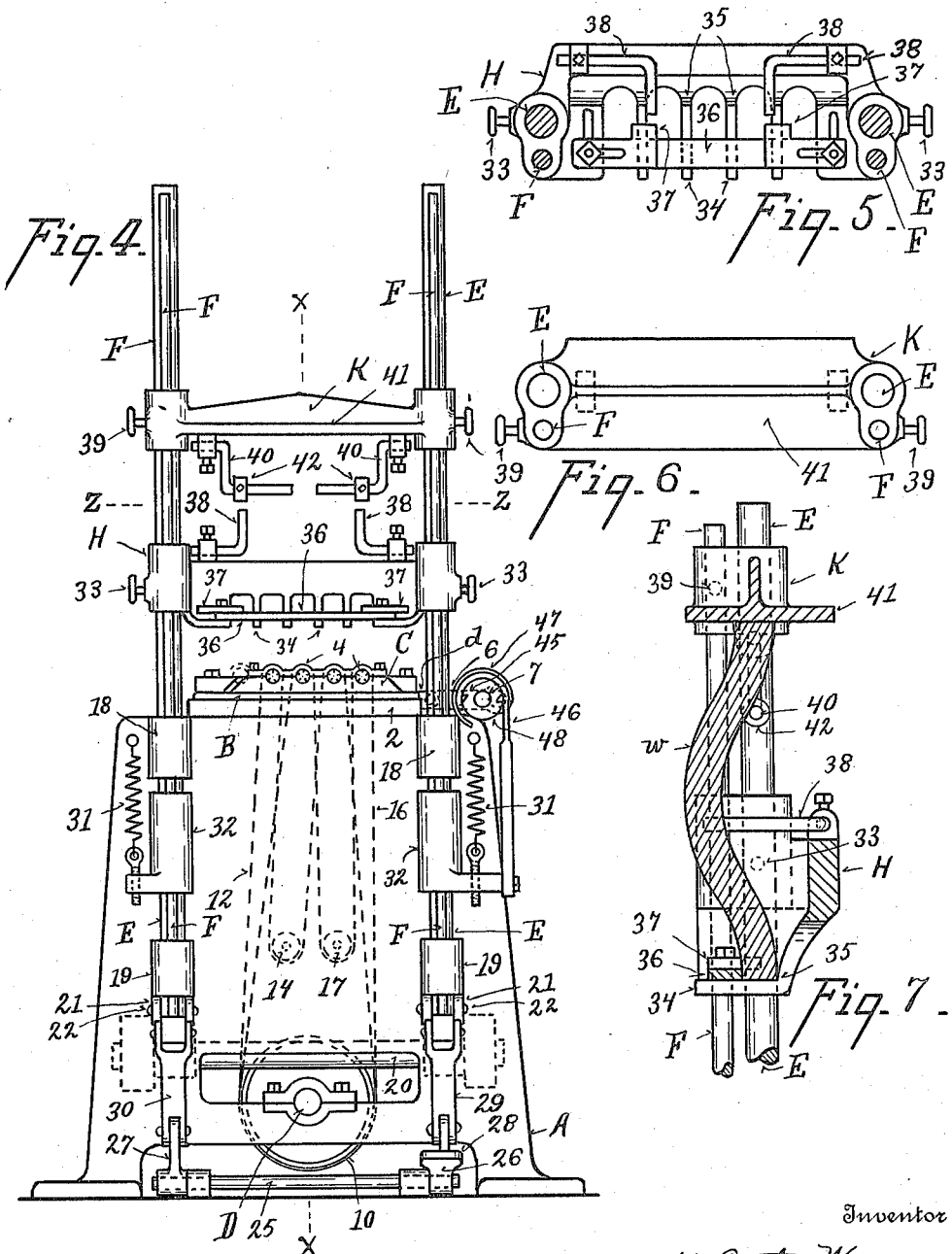

OLMEDO CORTEZ WYSONG, OF GREENSBORO, NORTH CAROLINA.

DOVETAILING MECHANISM.

1,166,299.  Specification of Letters Patent.  Patented Dec. 28, 1915.

Application filed September 18, 1912. Serial No. 720,999.

*To all whom it may concern:*

Be it known that I, OLMEDO CORTEZ WYSONG, a citizen of the United States, residing at Greensboro, in the county of Guilford and State of North Carolina, have invented certain new and useful Improvements in Dovetailing Mechanism, of which the following is a specification.

My invention relates to improvements in dovetailing machinery.

One of its objects is to provide improved mechanism to cut either blind or open dovetail grooves in the ends of the stock.

Another object is to provide improved means to support curved as well as straight stock.

Another object is to provide improved means to guide successive pieces of work to uniform position, and to readily clamp, feed and release the same.

My invention further comprises certain details of form, combination and arrangement all of which will be fully set forth in the description of the accompanying drawings, in which—

Figure 1 is a side elevation of my improved mechanism, with the crank shaft omitted. Fig. 2 is a sectional view of a portion of the machine on line $x$ $x$ of Fig. 4. Fig. 3 is a perspective view of a piece of stock or work with blind dovetail grooves cut therein. Fig. 4 is a front elevation of the machine. Fig. 5 is a sectional detail on line $z$ $z$ of Fig. 4, showing the lower stock holding member in top plan. Fig. 6 is a top plan view of the upper stock holding member. Fig. 7 is an enlarged sectional detail through the stock holding members and stock.

In the accompanying drawings representing the preferred embodiment of my invention, A represents the frame of the machine, which is provided with ways 2 across its top to support a traveling carriage B upon which carriage are journaled a series of spindles 3 armed at one end with dovetail cutters 4. The spindles are directly carried by a secondary carriage C adjustable endwise of the spindles upon and relative to the carriage B, while the movement of the carriage B is across the top of frame A at right angles to the spindle axis. The carriage C enables the depth of cut of all the spindles to be simultaneously adjusted while each spindle is adjustable endwise relative to carriage C to enable the several spindles to be alined, said adjustment of the respective spindles being by means of adjustable end or step bearings $a$ and collars 5. The carriage B is connected by means of links or pitmen 6, and ears $d$ to a crank shaft 7 by means of which carriage B is shifted transversely of the spindle axis. The spindles 3 are preferably spaced a sufficient distance apart so as to cut alternate dovetail grooves when the carriage is shifted respectively to the right and left hand positions. This enables strong spindles of relatively large diameter to be employed, and also enables the respective spindles to be belt driven. If desired, however, double the number of spindles may be employed to cut all the grooves at one operation.

D represents the main driving shaft provided with a loose pulley 8 and tight pulley 9, and two pulleys 10 and 11 to transmit motion to the spindles. A belt 12 from pulley 10 drives alternate spindles being tightened and yet allowed to yield to the transverse movement of carriage B by means of an idler pulley 14 carried by a weighted frame 15 hinged to frame A at one end. Belt 16 from pulley 11 serves to drive the remaining spindles being also engaged by an idler pulley 17 mounted in the same manner as pulley 14.

Vertically movable rods or bars E and F are supported close together in pairs by means of ears 18 and 19 carried by frame A in which ears the rods E and F slide vertically. The rods E are connected together at their lower ends so as to cause them to move in unison by means of a shaft 20 journaled to frame A and provided with crank arms 21 connected to rods E by means of pins 22 engaging slotted openings in the forked ends of crank arms 21. The shaft 20 is also provided with a weighted crank arm 24 which counterbalances the weight of the rods E and serves to normally hold the rods E and parts carried thereby in their elevated position.

A shaft 25 is pivotally supported by frame A or upon the floor beneath the frame A and is provided at opposite ends with crank arms 26 and 27, one of which is provided with a foot piece or treadle 28 to enable said shaft to be rocked by foot power. Links 29 and 30 connect the lower ends of rods F with the crank arms 26 and 27 so as to cause said rods F to move in unison. Springs 31 rigidly connected to frame A at one end and adjustably connected to collars 32 rigidly attached to rods F and slidably connected to rods E serve to normally hold the rods F in the elevated position.

A work holding member H is pierced at opposite ends for the passage of the rods E and F and is adjustable thereon to any desired height, and may be rigidly clamped to the rods E by means of set screws 33. Member H is provided with a series of teeth or lugs 34 spaced so that the dovetail cutters may pass between said teeth. The lower end of the stock or work rests upon the teeth 34 with one edge against the shoulder 35 formed in said teeth. An adjustable bar 36 engages the opposite lower edge of the stock while the adjustable members 37 engage the edges of the lower end of the stock to hold successive pieces of stock to a common position during the cutting of the dovetail grooves, to enable duplicate pieces of work to be produced. Adjustable guide members 38 also engage the edges of the stock to guide it to and hold it in position relative to member H.

The work holding member K is pierced at opposite ends for the passage of rods E and F and is adjustable thereon to any desired distance above the member H, depending upon the length of the stock to be cut. The set screws 39 serve to rigidly clamp the member K to the rods F, and in practice in position normally just out of contact with the upper end of the stock when the stock rests upon the teeth 34 of member H. Adjustable members 40 carried by member K serve to support the upper end of the stock or work w in position as indicated in Figs. 2 and 7 beneath the cross bar 41 of member K, with the adjustable collars 42 engaging the edges of the stock. As soon as the stock is in position and power applied to rotate the spindles the treadle 28 may be operated by foot power to draw downwardly the rods F carrying with them the member K which engages the upper end of the stock and serves to firmly clamp the stock between members K and H, and by force imparted from member K to member H through the stock to force member H and rods E downwardly against the action of the weighted arm 24 until the end of the stock engages and is acted upon by the spindle cutters cutting alternate dovetail grooves in the stock. The treadle is then allowed to rise sufficiently for the stock and member H to clear the spindle cutters, whereupon a pawl 45 carried by a thin flexible rod 46 attached to collar 32 and having its free end traveling in a circular groove or housing 47, about a ratchet wheel 48 carried by crank shaft 7 serves to throw said crank shaft a half turn and thereby to shift the carriage B to bring the spindles 3 to a new position to cut the remaining dovetail grooves. Other forms of mechanism may be employed to shift carriage B. The treadle 28 is then again fully depressed bringing the stock into engagement with the cutters, after which the treadle is released and the stock reversed to cut dovetail grooves in its opposite end or a new piece of stock inserted. The release of treadle 28 automatically releases the stock from the clamping action of members H and K, and said members automatically assume position to receive a new piece of stock. As illustrated in Figs. 2 and 7, various styles of curved stock as well as straight stock are adapted to be held and presented to the cutters.

In order that the meeting members of the dovetail joints may fit accurately, I preferably employ cutters comprising conical sections 4 to cut the dovetail recesses 51 and facing cutters 52 of larger diameter which cut overlapping facing cuts or grooves 53 of slight depth as indicated in Fig. 3.

The mechanism herein illustrated and described is capable of considerable modification without departing from the principle of my invention.

Having described my invention, what I claim is;

1. A dovetailing mechanism comprising a series of spindles armed with cutters and with their axes in substantially one plane, a work holder movable to and from said cutters and comprising clamping members to grasp the stock at opposite ends and present one end thereof endwise to said cutters, said work holder being recessed for the passage of said cutters and provided with a shoulder against which one edge of the end of the stock to be acted upon seats, and adjustable members to engage and hold the stock in a predetermined position with reference to said shoulder.

2. A dovetailing mechanism comprising a series of spindles armed with cutters and with their axes parallel and in substantially one plane, a work holder movable to and from said cutters and comprising clamping members to grasp the stock at opposite ends and present one end thereof endwise to said cutters, said work holder being provided with teeth to pass between said cutters and form supports for the end of the stock while being acted upon, with intervening recesses for the passage of said cutters, and a shoulder on said teeth to engage one edge of the end of the stock, and means to hold the end of the stock in a predetermined position with reference to said shoulder.

3. A dovetailing mechanism comprising a series of spindles armed with cutters arranged with their axes parallel and in substantially a horizontal plane, a work holder located above said cutters and comprising two independent clamping members to grasp opposite ends of the stock adjustable to and from each other and normally held apart and away from said cutters, and means to actuate one of said clamping members whereby the stock is clamped between said clamping members and brought into engagement endwise at one end with said cutters.

4. A dovetailing mechanism comprising a series of spindles armed with cutters arranged with their axes parallel and substantially in one plane, a work holder comprising two independent clamping members to grasp opposite ends of the stock normally held apart and away from said cutters ready for the insertion of the stock, means to predetermine the position of the stock with reference to said clamping members, and means to actuate one of said clamping members to clamp the stock between said clamping members and to feed the stock endwise into engagement with said cutters.

5. A dovetailing mechanism comprising a series of spindles armed with cutters arranged with their axes parallel and substantially in one plane, a work holder comprising two independent clamping members to grasp opposite ends of the stock normally held apart and away from said cutters ready for the insertion of the stock, means to predetermine the position of the stock with reference to said clamping members, mechanism to actuate one of said clamping members to clamp the stock between said clamping members and to feed the stock into engagement with said cutters, and means to shift said cutters transversely to the stock feed between separate engagements of the stock with said cutters.

6. A dovetailing mechanism comprising a series of spindles armed with cutters arranged with their axes parallel and substantially in one plane, a work holder comprising two adjustable stock clamping members to grasp opposite ends of the stock and present the stock endwise to said cutters, normally held away from said cutters and apart ready for the insertion of the stock, said clamping members adjacent to said cutters being provided with stock engaging members to engage the extreme end of the stock to hold said stock in a predetermined position and to pass between said cutters when the cutters engage the stock.

7. A dovetailing mechanism comprising a series of spindles armed with cutters arranged with their axes parallel and substantially in one plane, a work holder comprising two independently movable clamping members normally held apart and away from said cutters ready to receive and grasp opposite ends of the stock and present it endwise to said cutters, means carried by said clamping members to engage the extreme ends of the stock to hold the stock in predetermined relation to said clamping members, and mechanism to actuate one of said clamping members to clamp the stock between said clamping members and to feed the stock into engagement with said cutters.

8. A dovetailing mechanism comprising a plurality of spindles armed with cutters, and a work holder movable to and from said cutters to present the stock endwise to said cutters, said work holder comprising clamping members to respectively engage opposite ends of the stock.

9. A dovetailing mechanism comprising a stationary frame, a plurality of spindles armed with dovetailing cutters having their axes substantially in a horizontal plane, mounted upon said stationary frame, two independent vertically movable frames slidably mounted upon said stationary frame and projecting above said spindles, a work holding member vertically adjustable upon and capable of being locked to one of said vertically adjustable frames, a work holding member vertically adjustable upon and capable of being locked to the other of said vertically adjustable frames, means to normally hold said vertically movable frames in their elevated positions, and mechanism to depress one of said vertically movable frames to clamp stock members between said respective work holding members and to feed the stock members into contact with the cutters of said spindles by the further depression of both of said vertically movable frames.

10. A dovetailing mechanism comprising a stationary frame, a plurality of spindles armed with dovetail cutters with the axes of said spindles substantially in a horizontal plane, mounted above said stationary frame, a vertically movable frame slidably mounted upon and projecting above said stationary frame and counterbalanced to normally hold it in elevated position, a work holding member adjustably mounted upon holding member adjustable frame above said said vertically adjustable frame and capable of being locked to said vertically movable frame, a second vertically movable frame slidably mounted upon and projecting above said stationary frame, and counterbalanced to normally hold it in elevated position, a work holding member adjustably mounted upon and capable of being locked to said second vertically adjustable frame, said work holding members being substantially in a vertical plane one above the other, and means to depress one of said vertically adjustable frames to cause stock members to be grasped at their ends between said work holding members and fed into contact with the cutters of said spindles.

11. A dovetailing mechanism comprising a plurality of spindles mounted with their axes in substantially one plane and adjustable transversely to their axes within said plane, said spindles being armed with dovetailing cutters, means to reciprocate said spindles transversely to their axes and a work holding member to grasp opposite ends of the stock and present the stock endwise to said cutters, said work holder being movable to and from said cutters.

12. A dovetailing mechanism comprising a plurality of spindles mounted with their axes in substantially one plane and adjustable in unison transversely to their axes within said plane, said spindles being armed with grooving cutters to cut dovetail grooves in the end of the stock and with facing cutters to face one side of the stock adjacent to said dovetail grooves, means to reciprocate said spindles transversely to their axes and a work holder movable to and from said cutters to grasp opposite ends of the stock and present the stock endwise to said cutters.

In testimony whereof I have affixed my signature in presence of two witnesses.

OLMEDO CORTEZ WYSONG.

Witnesses:
J. K. MYRICK,
G. H. WALKER.

Copies of this patent may be obtained for five cents each, by addressing the "Commissioner of Patents, Washington, D. C."